(12) United States Patent
Taylor et al.

(10) Patent No.: US 6,802,357 B2
(45) Date of Patent: Oct. 12, 2004

(54) SCREEN ASSEMBLY

(75) Inventors: Peter Syme Taylor, Hamilon (AU); Andrew Craig Edlin, Sunnybank (AU)

(73) Assignee: Security Inventions Pty. Ltd., Toowong (AU)

( * ) Notice: Subject to any disclaimer, the term of this patent is extended or adjusted under 35 U.S.C. 154(b) by 0 days.

(21) Appl. No.: 10/330,553

(22) Filed: Dec. 30, 2002

(65) Prior Publication Data

US 2003/0131954 A1 Jul. 17, 2003

Related U.S. Application Data

(63) Continuation of application No. 09/253,060, filed on Feb. 19, 1999, now abandoned.

(51) Int. Cl.[7] .................................................. A47G 5/00
(52) U.S. Cl. ........................................ 160/371; 160/392
(58) Field of Search ........................ 160/371, 391, 160/392, 395, 369

(56) References Cited

U.S. PATENT DOCUMENTS

| | | | | |
|---|---|---|---|---|
| 1,250,376 A | * | 12/1917 | Seelye et al. | 160/391 X |
| 2,255,581 A | * | 9/1941 | Ewing | 160/392 |
| 2,335,361 A | * | 11/1943 | Schiller | 160/395 X |
| 2,784,781 A | * | 3/1957 | Rhoades | 160/371 |
| 2,886,481 A | * | 5/1959 | Swan | 160/391 X |
| 3,255,810 A | * | 6/1966 | Rowbottam | 160/371 X |
| 3,455,367 A | * | 7/1969 | Le Tarte | 160/371 |
| 3,552,476 A | * | 1/1971 | Le Tarte | 160/371 |
| 3,720,256 A | * | 3/1973 | Fralick et al. | 160/392 |
| 3,991,806 A | * | 11/1976 | Abell | 160/392 X |
| 5,301,737 A | * | 4/1994 | Martin | 160/395 X |

* cited by examiner

*Primary Examiner*—David Purol
(74) *Attorney, Agent, or Firm*—Baker Botts L.L.P.

(57) ABSTRACT

This invention in one aspect relates to a security screen assembly 30 including a frame assembly including a plurality of frame members 32 which are assembled in such a manner that they define an opening which is closed by a sheet of a mesh like material a sheet 14. The assembly 30 further includes two opposing gripping members adapted to grip an edge portion of the sheet of mesh like material 14 and wherein at least one of the frame members 32 includes a channel shaped recess which is adapted to receive the two opposing gripping members, the channel shaped recess having an opening which does not permit the two opposing gripping members to pass therethrough.

7 Claims, 6 Drawing Sheets

SCREEN ASSEMBLY

The present application claims priority from and is a continuation of U.S. patent application Ser. No. 09/253,060 filed Feb. 19, 1999, entitled "Screen Assembly," now abandoned the disclosure of which is incorporated herein by reference.

BACKGROUND OF THE INVENTION

1. Field of the Invention

This invention relates to screen assembly.

2. Description of Related Art

This invention has particular but not exclusive application to a security screen assembly for doors and windows of buildings including domestic residences and such like, and for illustrative purposes reference will be made to such application. However, it its to be understood that this invention could be used in other applications, such as security screens for motor vehicles including those used by police to detain persons. This invention may also be used in the construction of insect screens for doors and windows as well as screens for covering openings in drains, air conditioning vent and such like, or as a wall or petition for structures such as bus shelters and telephone boxes. The screen assembly may also be used in the construction of cages and such like which may be used to detain animals or prisoners.

Typically security screens include a frame, consisting of a plurality of frame members, and a sheet of stainless steel mesh secured to adjacent frame members by clamping members. The clamping members are usually fastened to the frame members using a plurality of threaded fasteners or rivets spaced along the length of the frame members. The fasteners are typically hidden from view by a cover strip made from a plastics material which is not very aesthetic, the cover strip being mounted on the internal face of the frame member.

Unfortunately security screens of this type described above are not always effective in preventing intruders passing through a window or door fitter with same. For example thieves who may have gained entry into the house may use a cold chisel to sever the heads of rivets used to fasten clamping members to the frame members thereby enabling thieves to dislodge the stainless steel mesh. Similarly, a screw driver may be used to unscrew the threaded fasteners used to secure the mesh to the screen.

Furthermore, the pressure applied to the fasteners to the mesh is not evenly distributed along the length of the mesh and wherein as a consequent the screens include weak spots located between adjacent fasteners.

Other screens may include gaps between the clamping members and the mesh and/or frame member which are wide enough to allow persons to insert a screw driver or such like there between so as to prise the mesh apart or dislodge the clamping members.

It is also noted that the clamping members and the frame members are usually manufactured from aluminum and wherein the fasteners are manufactured from a variety of metals including steel and brass. Contact between dissimilar metals, such as between the clamping members and the stainless steel mesh, or the brass screws and the clamping members, often leads to galvanic corrosion of at least one of the elements of the screens referred to above which in turn has a detrimental effect on the efficiency and aesthetics of same. For example, due to the corrosive effects of sea air, the fasteners often become brittle and whereby their ability to withstand blows to the stainless steel mesh is severely inhibited.

It is noted that security screens of the type described above are time consuming to manufacture.

SUMMARY OF THE INVENTION

The present invention aims to alleviate at least on of the above disadvantages and to provide a screen assembly which will be reliable and efficient in use. Other objects and advantages of this invention will hereinafter become apparent.

With the foregoing and other objects in view, this invention in one aspect resides broadly in a security screen assembly including:

a sheet of mesh like material having an edge portion;

a frame assembly including a plurality of elongate frame members which are assembled in such a manner that they define an opening which is a least partially closed by said sheet of mesh like material and wherein at least one of said frame members includes an elongate slot;

an elongate fastener closely received in said elongate slot, said elongate fastener having an elongate opening which closely received said edge portion of said mesh like material.

Preferably the edge portion extends along the entire length or width of the sheet of mesh like material and wherein the entire edge portion is retained by the elongate fastener.

Preferably, the elongate fastener is frictionally retained within the slot and wherein the fastener may be constructed from a deformable material.

In one embodiment, the fastener may be constructed from two materials. For example, the material which bears against the mesh like material may be easily deformed and may readily conform to the shape of the mesh like material. Furthermore, some of the material that bears against the mesh like material may be deformable that it may in fact penetrate the gaps between adjacent wefts or adjacent warps.

The material that bears against the frame member however may be harder than the material that bears against the mesh like material. For example, the fastener may include a hardened skin which may also be useful in guarding against penetration of a object, such as a screw driver, between the frame member and the mesh like material.

Preferably, the attachment means consists of gripping means adapted to grip opposing sides of an edge portion of the sheet of mesh like material and a recess associated with one of the frame members which is adapted to retain the gripping means. For example, in one embodiment the gripping means may be jammed into the slot which may be a recess. However, in other embodiments the gripping means may be retained within the recess by the use of suitable adhesive applied preferably to the entire length of the gripping means.

In another aspect this invention relates to a screen assembly including:

a sheet of mesh like material;

gripping means adapted to grip opposing sides of an edge portion of said sheet of mesh like material;

a frame assembly including a plurality of frame members which are assembled in such a manner that they define an opening which is at least partially closed by said sheet of a mesh like material and wherein at least one of said frame members includes retaining means having an opening which is adapted to receive said gripping means.

Preferably the retaining means is a recess and the gripping means is jammed into the recess. However it will be appreciated that in other embodiments, the gripping means may be retained within the recess by the use of a suitable adhesive or plurality of mechanical fasteners, such as screws or rivets.

In another aspect this invention relates to a screen assembly including:
- a sheet of a mesh like material;
- gripping means adapted to hold an edge portion of said sheet of a mesh like material:
  - a frame assembly including a plurality of frame members which are assembled in such a manner that they define a opening which is at partially closed by said sheet of a mesh like material, and
  - mounting means associated with one of said frame elements for mounting said gripping means to said frame element.

In a preferred embodiment the gripping means acts like a plug and said mounting means includes a recess which is adapted to receive said plug. Preferably the gripping means is jammed in to the recess and is retained therein.

In yet another aspect this invention relates to a screen assembly including:
- a sheet of a mesh like material;
- a plug like means associated with an edge portion of said sheet of mesh like material;
- a frame including a plurality of frame elements which are arranged in a manner such that they define an opening which is at least partially closed by said sheet of a mesh like material, and receiving means associated with one of said frame elements which is adapted to receive and retain said plug like means.

In one embodiment the plug like means may include an edge portion of the mesh like material which has been deformed in some way so as to render it thicker than the central portion of the mesh like material. For example the mesh like material may be included folded or enlarged edge portions which may be used as a plug.

In an alternative embodiment the plug like means may consist of selected edge portions of the mesh like material which are coated with an additional layer or numerous layers of a metal or a plastics material so as to create an enlarged edge portion which may be used as a plug.

In yet another embodiment the plug like means may consist of an additional member, such as a strip of wood, metal or plastics material which is fastened to the edge portion of the mesh like material using one or more fasteners or a suitable adhesive and wherein use the additional member may be jammed into the receiving means. In some embodiments the additional member may be shaped like a wedge and may include one or more tapered side walls.

In yet another aspect this invention relates to a screen assembly including:
- a sheet of a mesh like material:
  - a frame including a plurality of frame elements which are arranged in a manner such that they define an opening which is a least partially closed by said sheet of mesh like material;
  - attachment means for attaching said sheet of a mesh like material to at least one of said frame elements, the pressure applied by said attachment means to said sheet of a mesh like material being substantially even along the length of said sheet of a mesh like material.

Preferably the attachment means includes gripping means adapted to grip opposing sides of an edge portion of the sheet of mesh like material and a recess associated with one of the frame member which is adapted to retain the gripping means. For example, in one embodiment the gripping means may be jammed in to the recess. However, in other embodiments the gripping means may be retained within the recess by the use of a suitable adhesive applied preferably to the entire length of the gripping means.

In yet another aspect this invention relates to a screen assembly including:
- a sheet of a mesh like material;
- a frame including a plurality of frame elements which are arranged in a manner such that they define an opening which is at least partially closed by said sheet of a mesh like material;
- attachment means for attaching said sheet of a mesh like material to at least one of said frame elements, and
- insulation means separating said sheet of a mesh like material from said frame elements.

In a preferred embodiment the attachment means includes gripping means adapted to grip an edge portion of the mesh like material and wherein at least those portions of said gripping means which are in contact with either the mesh or the frame elements are manufactured from an insulating material such as a plastics material or rubber material.

However it will be appreciated that in other embodiments the attachment means may consist of plug like means made from an insulating material. For example, as stated previously, selected edge portions of the mesh like material may be coated with one or more layers of a plastics material so as to create an enlarged edge portion which may be jammed in a receiving means of a frame element. Alternatively an additional member manufactured from an insulated material may be secured to opposing sides of an edge portion of the mesh like material that is retained within a receiving means of a frame member.

In still yet another aspect this invention relates to a screen assembly including:
- a sheet of mesh like material;
- a frame including a plurality of frame elements which are arranged in a manner such that they define an opening which is at least partially closed by said sheet of a mesh like material;
- attachment means for attaching said sheet of a mesh like material to at least one of said frame elements, and
- filling means locatable intermediate said sheet of a mesh like material and adjacent edge portions of said frame element to which said mesh like material is attached whereby said filling means inhibits the insertion of a foreign object between said portions and said sheet of a mesh like material.

In a preferred embodiment the attachment means includes gripping means adapted to grip an edge portion of the mesh like material, said gripping means having a gripping portion which is locatable intermediate the mesh like material and the adjacent edge of the frame element which also acts as a filling means.

Alternatively the filling means may include a mouldable material which may be inserted in a recess formed in the frame elements and wherein an edge portion of the mesh like material may be immersed in the mouldable material before it has had time to set.

In yet another embodiment, the filling means may include pads/portions of a deformable material positioned intermediate the mesh and the frame elements during the assembly process.

In yet another aspect this invention relates to a screen assembly including:

a sheet of a mesh like material;

a frame including a plurality of frame elements which are arranged in a manner such that they define an opening which is at least partially closed by said sheet of a mesh like material, and attachment means for attaching said sheet of a mesh like material to at least one of said frame elements, characterized in that said attachment means does not include fasteners which extend at least part way through said frame and said sheet of a mesh like material is not mounted on the exterior of the frame.

In a preferred embodiment the attachments means includes gripping means adapted to grip an edge portion of the mesh like material and is sandwiched between opposing portions of the frame such as a recess formed therein.

With regard to each of the various aspects of the invention referred to above, the mesh like material may be of woven or non-woven construction and manufactured from a variety of metal and/or plastics materials. Depending upon the intended purpose of the screen, the mesh may be rigid, semi-rigid or a flexible mesh. For example, insect screen assemblies may include a flexible mesh manufactured from a plastics material.

Security screens, drains and screens mounted over openings in vents such like typically include a rigid mesh. Accordingly, in some applications the mesh like material may be manufactured from extruded fibres composed of synthetic long chain polymides which are very strong and are often referred to by the trade name "kevlar". Alternatively, the mesh like material may be manufactured from aluminum, brass, steel, stainless steel or numerous other metal alloys. The mesh like material may be of a woven or non-woven construction and the case of security screens, while primarily intended to resist attack by would be intruders, the mesh like material may also be adapted to inhibit the passage therethrough of selected insects and/or other pests such as mice and snakes. For example, the mesh like material may include a plurality of wires woven together in a manner whereby the spacing between adjacent warps is not greater than 2.2 mm and the spacing between adjacent warps is no greater than 2.2 mm. Alternatively the mesh like material may be an expanded mesh.

The gripping means referred to above may consist of two opposing gripping members linked by connecting means.

The connecting means may consist of an intermediate web portion linking the two gripping members. Alternatively, the connecting means may include a fastener, such as rivet or a screw, used to secure one gripping member to the other.

The gripping members may be adapted to cover or envelop an edge portion of the mesh like material, the gripping means being manufactured from a plastics material such as nylon or PVC. The external walls of the gripping means may be adapted to engage abutting portions of the retaining means. For example the external walls may be tapered and/or may include ribs, barbs or other surface irregularities.

The gripping members may be constructed from a variety of materials including various metals and plastics materials. The construction of the gripping members may be substantially homogeneous.

Alternatively, the gripping means may be constructed from two or more different materials.

For example, the gripping members may have a laminar construction and wherein the portion of each gripping member that bears against the mesh like material may be more easily deformed and hence more inclined to conform to the shape of the mesh like material than the portion of the gripping member that bears against the surfaces of the retaining means.

The retaining means may include a channel shaped recess extending at lest part way along the length of the frame element or frame member. For example, the frame member may be constructed from an extruded section and wherein the extrusion may include a recess formed therein which is adapted to receive an edge portion of the mesh like material and any gripping means that may be attached thereto. Alternatively a separate member having a recess formed therein which is adapted to receive an edge portion of the mesh like material and any gripping means attached thereto may be secured to the frame element or frame member.

BRIEF DESCRIPTION OF THE DRAWINGS

In order that this invention may be more easily understood and put into practical effect, reference will now be made to the accompanying drawings which illustrate a preferred embodiment of the invention, wherein.

DETAILED DESCRIPTION OF PREFERRED EMBODIMENTS

Figure 1:
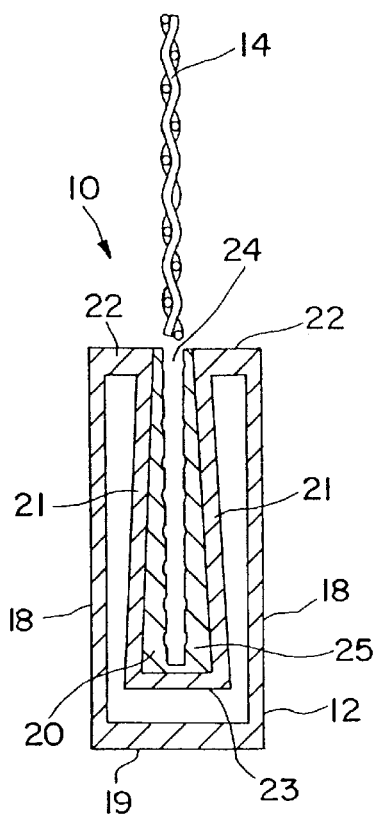
FIG. 1 is a cross-sectional end view of a security screen assembly constructed in accordance with the present invention, said assembly being shown in a partially disassembled state.
Figure 2A:
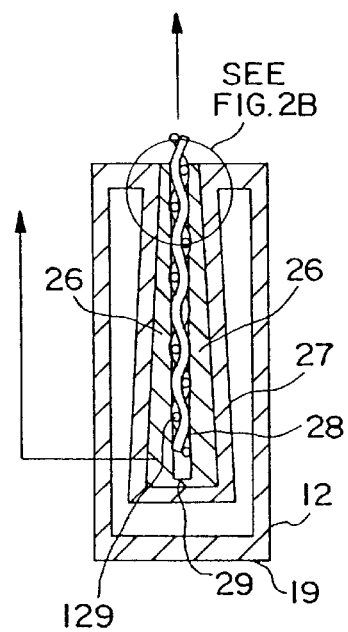
FIGS. 2 & 3 both include cross-sectional end views of the security screen assembly illustrated in FIG. 1.
Figure 3:
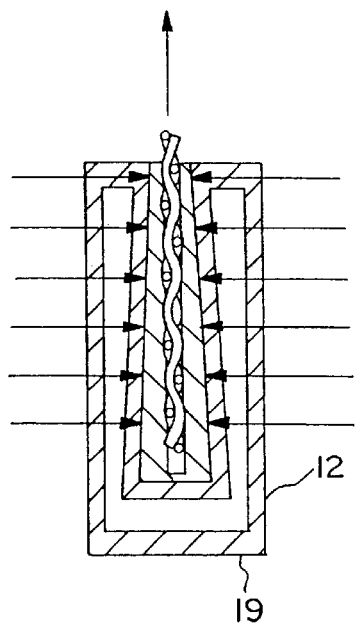
Figure 2B:
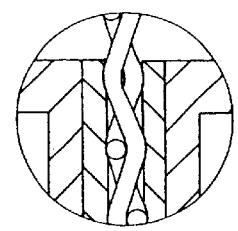

FIGS. 1 to 3 illustrate a security screen assembly 10 which includes a rectangular frame constructed from a plurality of frame members 12 which define an opening which is closed by a sheet of mesh like material 14.

The mesh like material includes a woven grid of stainless steel wire which has dimensions selected from the table below.

| No. of Mesh Wires per 25 mm | Wire Diameter in mm | Mesh open area | weft/warp spacings in mm |
|---|---|---|---|
| 14 × 14 | 0.8 | 29.8% | 0.1 mm |
| 14 × 14 | 0.7 | 36.2% | 1.1 mm |
| 14 × 14 | 0.5 | 31.0% | 1.3 mm |
| 12 × 12 | 1.0 | 25.4% | 1.0 mm |
| 12 × 12 | 0.9 | 33.2% | 1.2 mm |
| 12 × 12 | 0.7 | 43.6% | 1.4 mm |

-continued

| No. of Mesh Wires per 25 mm | Wire Diameter in mm | Mesh open area | weft/warp spacings in mm |
| --- | --- | --- | --- |
| 12 × 12 | 0.6 | 51.8% | 1.5 mm |
| 11 × 11 | 1.0 | 25.4% | 1.0 mm |
| 11 × 11 | 0.9 | 33.2% | 1.2 mm |
| 11 × 11 | 0.8 | 43.6% | 1.4 mm |
| 11 × 11 | 0.7 | 51.8% | 1.5 mm |
| 10 × 10 | 1.2 | 28.1% | 1.3 mm |
| 10 × 10 | 1.0 | 34.8% | 1.0 mm |
| 10 × 10 | 0.9 | 42.3% | 1.6 mm |
| 10 × 10 | 0.8 | 46.2% | 1.7 mm |
| 10 × 10 | 0.7 | 51.8% | 1.8 mm |
| 8 × 8 | 1.2 | 38.9% | 2.0 mm |
| 8 × 8 | 1.0 | 38.9% | 2.0 mm |
| 8 × 8 | 0.9 | 51.8% | 2.2 mm |

The frame members 12 are each cut from an extruded length of stainless steel or aluminum and wherein angled stakes, not shown, are used to connect the mitred ends of adjacent frame members together.

The frame members 12 each include two parallel opposing external side walls 18 which are maintained in a spaced relationship be an intermediate external web like member 19. Each frame member 12 also includes an internal channel shaped recess 20 which is open to the exterior of the extrusion. The internal recess 20 includes two opposing side walls 21 which are connected to the side walls 18 by respective flanges 22. The side walls 21 are interconnected by an internal web like member 23 and converge toward an opening 24 defined by the edges of said flanges 22.

The internal recess 20 is adapted to receive a complementary shaped insert or cover strip 25 which is manufactured from a nylon material. The insert 25 includes two opposing side walls 26 having ramped external surfaces 27 and parallel internal surfaces 28. The side walls 26 are interconnected by an intermediate web like member 29.

The internal surfaces 28 preferably include a matrix of lateral and longitudinal ribs 128 which are locatable on either side of the wefts and warps of the mesh like material when the edge portions of said mesh like material are each located within a respective insert 25.

Figure 4:
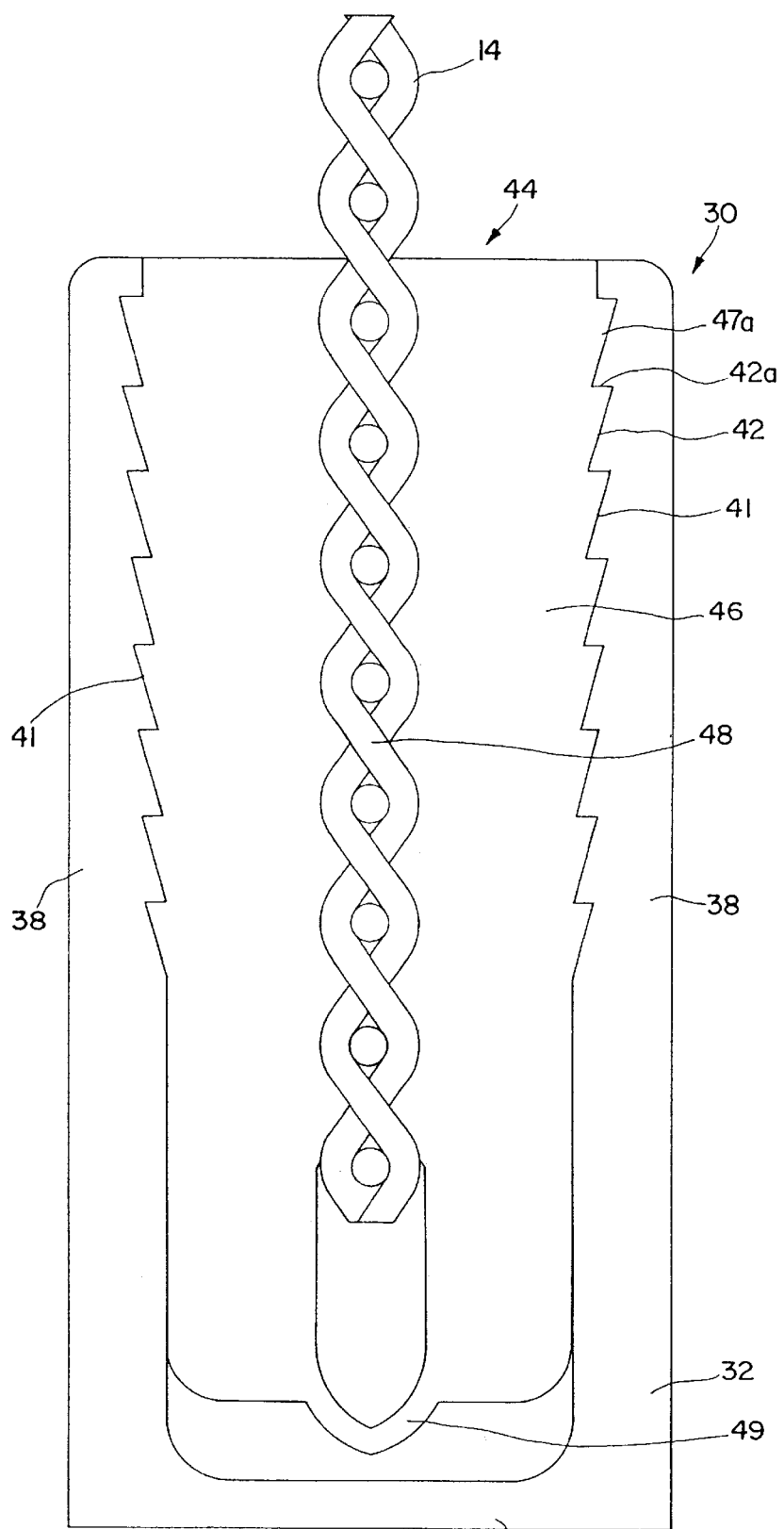
FIG. 4 is a cross-sectional end view of another security screen assembly constructed in accordance with the present invention.
Figure 5:
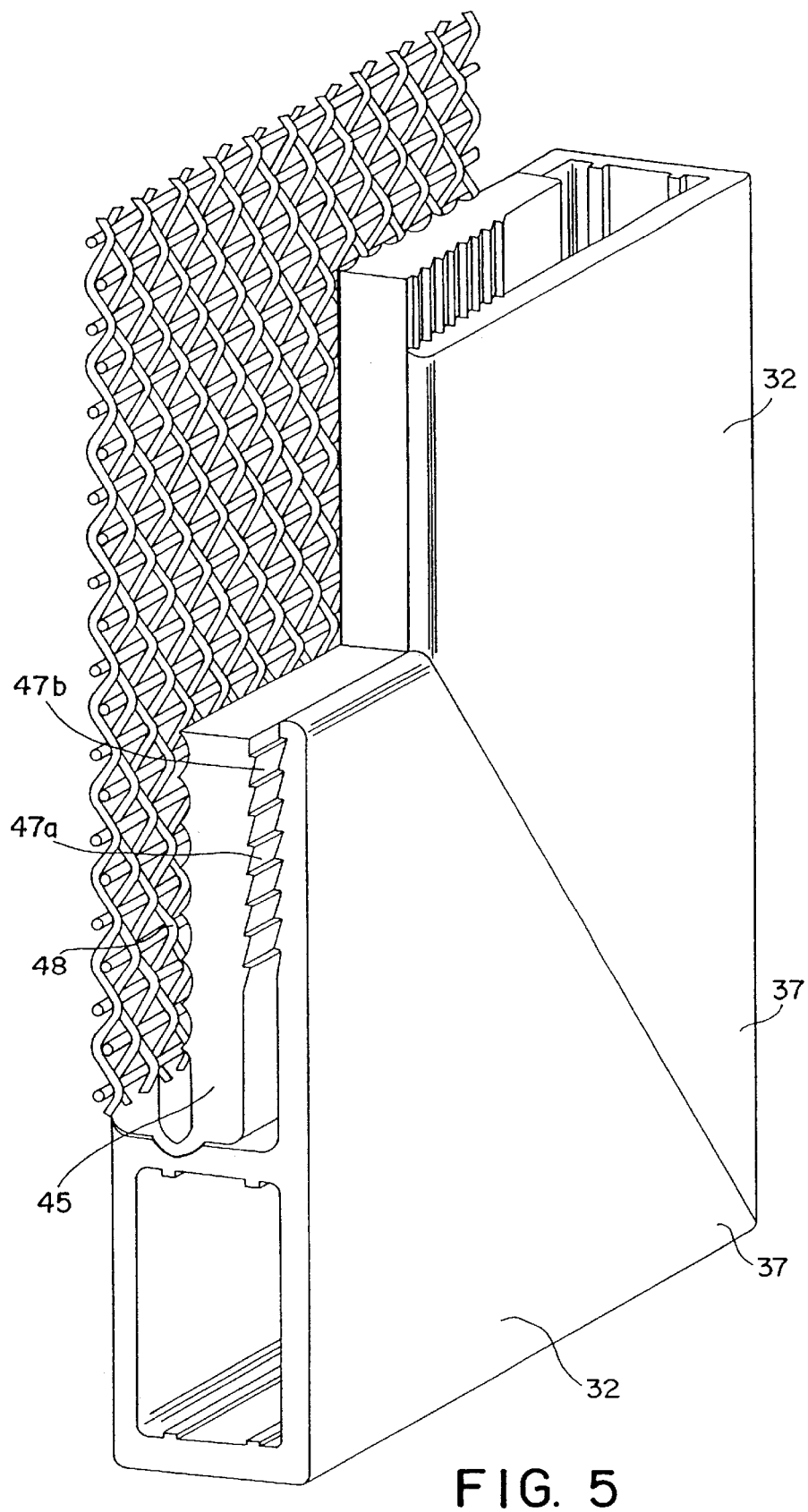
FIG. 5 is a perspective view of a corner section of the security screen assembly illustrated in FIG. 4.
Figure 6:
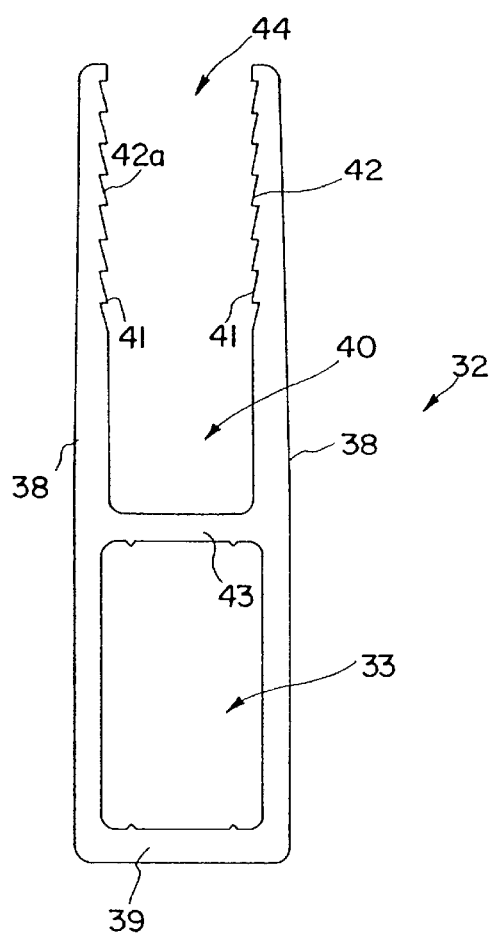
FIG. 6 is an end view of a window frame member used in the construction of the security screen assembly illustrated in FIG. 4.

FIGS. 4 and 5 illustrate a second screen assembly 30 of similar construction to the screen assembly 10. The screen assembly 30 includes a rectangular frame comprising a plurality of frame members 32 which define an opening which is closed by a sheet of a mesh like material 14.

The frame members 32 are each cut from an extruded length of stainless steel or aluminum and wherein angled stakes, the ends of which are located in respective tubular portions 33, are used to connect the mitred ends 37 of adjacent frame members together.

The frame members 32 each include two parallel opposing external side walls 38 which re maintained in a spaced relationship be an intermediate external web like member 39. Each frame member 12 also includes an internal channel shaped recess 40 which is open to the exterior of the extrusion. The internal recess 40 includes two opposing side walls 41. The side walls 41 are interconnected by an internal web like member 43. The upper portions 42 of the side walls 41 each include a plurality of barb like ribs 42a which extend longitudinally along the length of the frame member.

The internal recess 40 is adapted to receive a complementary shaped insert or cover strip 45 which is manufactured from a nylon material. The insert 45 includes two opposing side walls 46 having external surfaces 47 and internal surfaces 48. The side walls 46 are interconnected by an intermediate web like member 49.

The internal surfaces 48 preferably include a plurality of recesses or grooves 49a which extend longitudinally along the length thereof in which selected portions of the mesh 14 may nest as illustrated in the figures.

The upper portions 47a of the external side walls 47 diverge away from one another in the general direction of the opening 44. The upper portions 47a of the side walls 47 each include a plurality of barb like ribs 47b which extend longitudinally along the length of the insert.

In use, the frame members 12 are cut into suitable lengths and wherein an insert 25 is slid into the internal recess such that it extends substantially along the length thereof.

Before connecting the individual frame members 12 together, the end portions of the mesh like material are each inserted between the opposing walls 26 of the insert, the distance separating said walls 26 being slightly less than the width of the mesh.

The frame members 12 are interconnected by a plurality of angled stake members whereby each arm member of the stake member is located in a respective cavity 60.

If a pulling force is applied to the mesh, it tends to pull the insert out of the frame. However, due to the reverse taper of the insert, the insert tends to tighten about the mesh as illustrated in FIG. 3.

The second security screen assembly 30 is assembled in a similar fashion but wherein the inserts 45 are fitted to the edge portions of the mesh prior to the insertion of the inserts 45 into respective internal recesses 40, the width of the inserts being slightly larger than the width of the recesses 40. The barbs 47b engage complementary barbs 42a as illustrated in FIGS. 4 and 5. The engagement of the respective barbs resists the removal of the mesh from the frame member.

The frame members 32 in turn are interconnected by a plurality of angled stake members, the ends of which are located in respective tubular portions 33, as previously described.

It will be appreciated that in use the inserts grip the mesh located therebetween and apply an even pressure to the mesh along the length of the frame members. The inserts also insulate the mesh from the frame members and fill any gaps between the mesh and the frame members.

Figure 8:
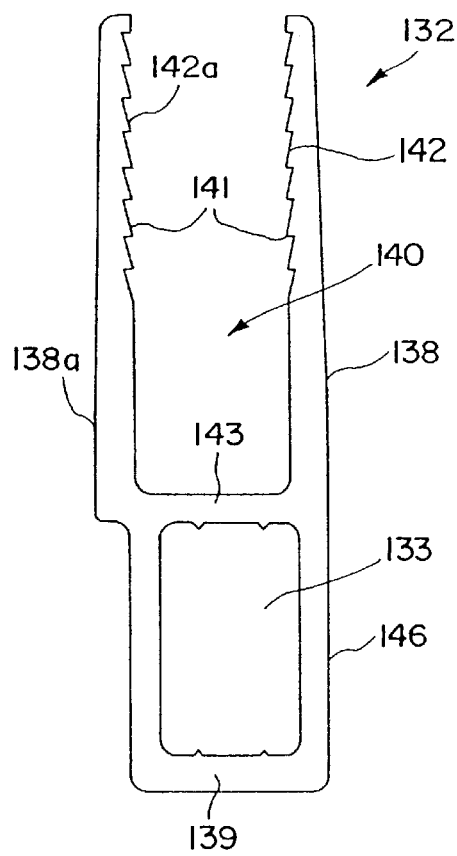
FIG. 8 is an end view of a stepped window frame member constructed in accordance with the present invention.
Figure 7:
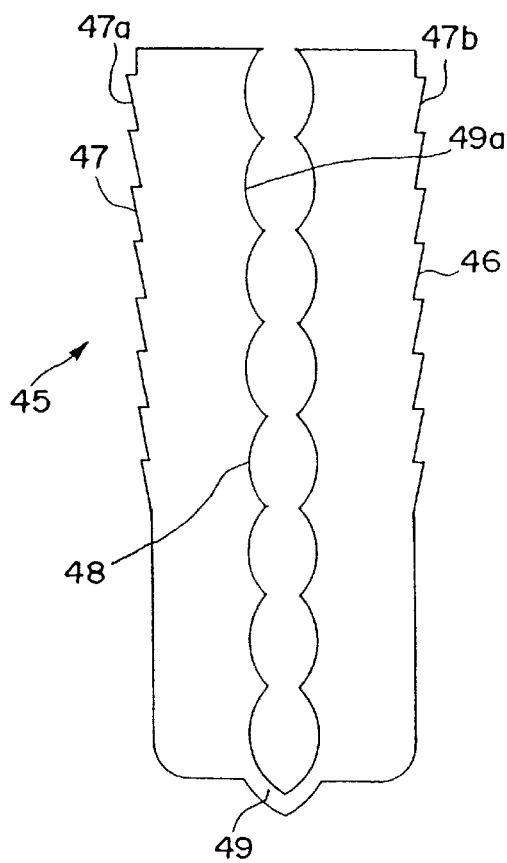
FIG. 7 is an end view of an insert used in the construction of the security screen assembly illustrated in FIG. 4.

FIG. 8 illustrates a stepped window frame member 132 which is very similar to the frame member 32. The frame member 132 may be cut from an extruded length of stainless steel or aluminum and wherein angled stakes, the ends of which are located in respective tubular portions 133, may be used to connect the mitred ends of adjacent frame members 132 together.

The frame member 132 includes two parallel opposing external side walls 138 and 138a which are maintained in a spaced relationship by an intermediate external web like member 139. Each frame member 132 also includes a channel shaped recess 140 which is open to the exterior of the extrusion. The recess 140 includes two opposing internal side walls 141. The side walls 141 are interconnected by an internal web like member 143. The upper portions 142 of the side walls 141 each include a plurality of barb like ribs 142a which extend longitudinally along the length of the frame member. The recess 140 is adapted to receive a complementary shaped insert or cover strip 45.

The tubular portion 146 of the frame member 132 may be located within a channel shaped portion of an adjacent window frame member and wherein in order to accommodate the narrowness of some channel portions, the side wall 138a includes a stepped portion 138b.

Figure 9:
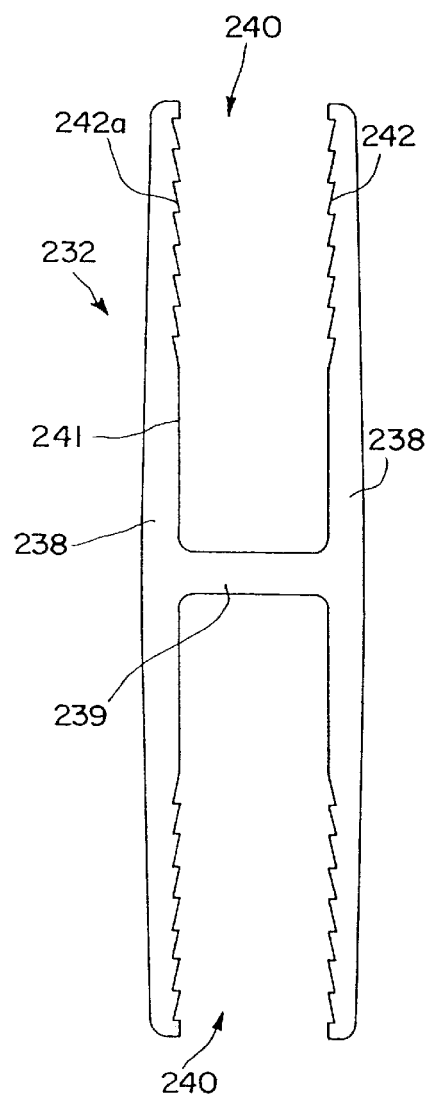
FIG. 9 is an end view of a mid rail frame member constructed in accordance with the present invention.

FIG. 9 illustrates a mid rail frame member 232 which is very similar to the frame member 32. The frame member 232 may be cut from an extruded length of stainless steel or aluminum and includes two parallel opposing external side walls 238 which are maintained in a spaced relationship by an intermediate web like member 239. The walls 238 and web 239 define two opposing channel shaped recesses 240 which are each open to the exterior of the extrusion and are adapted to receive a complementary shaped insert or plug 45.

Each recess 240 includes two opposing internal side walls 241 and wherein the upper portions 242 of the side walls 241 each include a plurality of barb like ribs 242a which extend longitudinally along the length of the frame member.

Figure 10:
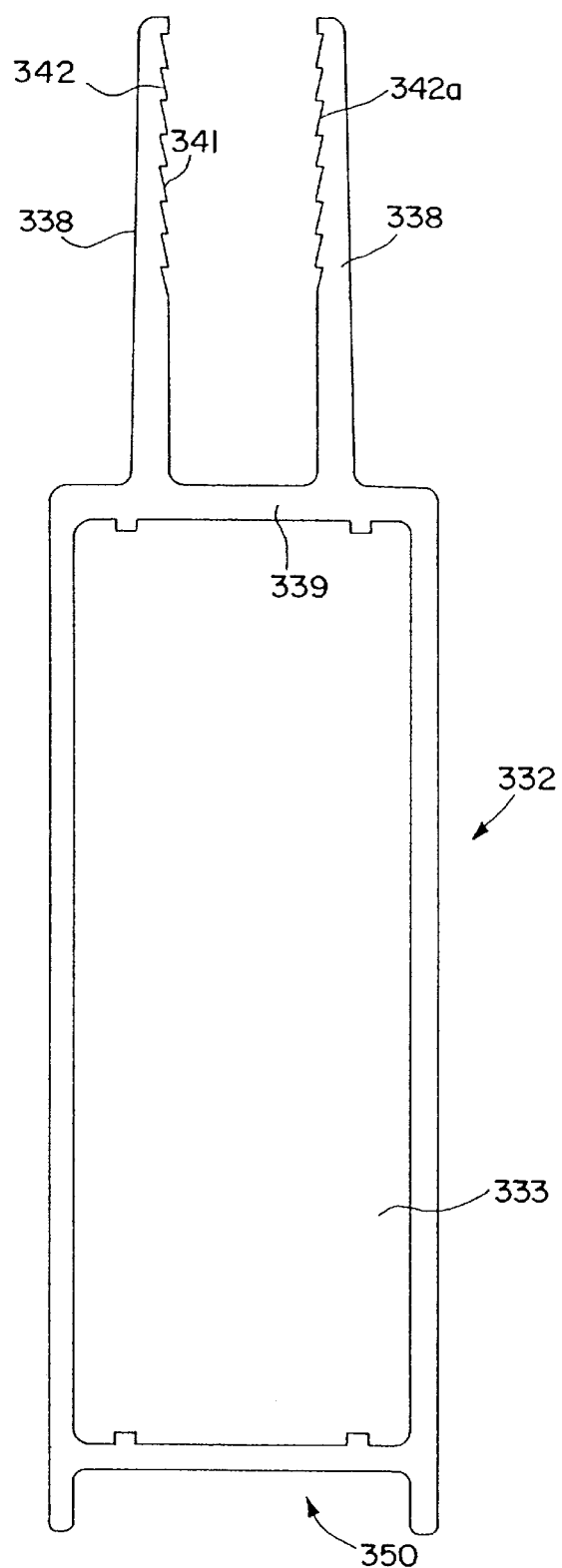
FIG. 10 is an end view of a door member constructed in accordance with the present invention.

FIG. 10 illustrates a door frame member 332 which is very similar to the frame member 32. The door frame member 332 may be cut from an extruded length of stainless steel or aluminum and wherein angled stakes, the ends of which are located in respective tubular portions 333, may be used to connect the mitred ends of adjacent frame members 332 together.

The door frame member 332 includes an open channel shaped recess 340 mounted on the tubular portion 333, the recess 340 being defined by two opposing side walls 338 and an intermediate web like member 339. The recess 340 includes two opposing internal side walls 341 and wherein the upper portions 342 of the side walls 341 each include a plurality of barb like ribs 342a which extend longitudinally along the length of the frame member. The recess 340 is adapted to receive a complementary shaped insert or cover strip 45.

The door frame member 332 also includes a shallow open channel shaped recess 350 and wherein use rollers or hinges may be located within said recess.

It will of course be realized that the above has been given only by way of illustrative example of the present invention and that all such modifications and variations thereto as would be apparent to persons skilled in the art are deemed to fall within the broad scope and ambit of this invention as is herein defined in the appended claims.

What is claimed is:

1. A security screen assembly comprising:
    a rigid security screen having an edge;
    a frame assembly comprising a plurality of frame members which are assembled to define an open area which is at least partially closed by the rigid security screen, wherein at least one of the frame members has a first slot formed therein, and each of at least two opposing sides of the first slot has a first means for engaging selected from the group consisting of a first plurality of recesses formed therein and a first plurality of teeth extending therefrom; and
    a fastener positioned within the first slot, wherein the fastener has a second slot formed therein, and the second slot is adapted to engage the edge of the rigid security screen, wherein each of at least two opposing sides of the fastener has a second means for engaging selected from the group consisting of a second plurality of recesses formed therein and a second plurality of teeth extending therefrom, wherein each of the first means for engaging directly engage at least a portion of a corresponding one of the second means for engaging, wherein each of at least two opposing sides of the second slot has a third means for engaging selected from the group consisting of a third plurality of recesses formed therein and a third plurality of teeth extending therefrom, wherein each of the third means for engaging is adapted to engage a portion of the rigid security screen.

2. The security screen assembly of claim 1, wherein each of the first plurality of recess, the second plurality of recesses, and the third plurality of recesses are ratchet-shaped recesses.

3. The security screen assembly of claim 1, wherein each of the first plurality of teeth, the second plurality of teeth, and the third plurality of teeth are ratchet-shaped teeth.

4. A security screen assembly comprising:
    a rigid security screen having an edge and lying substantially in a single plane;
    a frame assembly comprising a plurality of frame members which are assembled to define an open area which is at least partially closed by the rigid security screen, wherein at least one of the frame members has a first slot formed therein, and at least one side of the first slot has a first means for engaging selected from the group consisting of a first plurality of recesses formed therein and a first plurality of teeth extending therefrom; and
    a fastener positioned within the first slot, wherein the fastener has a second slot formed therein, and the second slot is adapted to engage the edge of the rigid security screen, wherein at least one side of the fastener has a second means for engaging selected from the group consisting of a second plurality of recesses formed therein and a second plurality of teeth extending therefrom, wherein the first means for engaging directly engages at least a portion of the second means for engaging, wherein at least one side of the second slot has a third means for engaging selected from the group consisting of a third plurality of recesses formed therein and a third plurality of teeth extending therefrom, wherein the third means for engaging is adapted to engage a portion of the rigid security screen.

5. The security screen assembly of claim 4, wherein each of the first plurality of recess, the second plurality of recesses, and the third plurality of recesses are ratchet-shaped recesses.

6. The security screen assembly of claim 4, wherein each of the first plurality of teeth, the second plurality of teeth, and the third plurality of teeth are ratchet-shaped teeth.

7. A security screen assembly comprising:
    a rigid security screen having an edge and lying substantially in a single plane;
    a frame assembly comprising a plurality of frame members which are assembled to define an open area which is at least partially closed by the rigid security screen, wherein at least one of the frame members has a first slot formed therein, and each of at least two opposing sides of the first slot has a first means for engaging selected from the group consisting of a first plurality of ratchet-shaped recesses formed therein and a first plurality of ratchet-shaped teeth extending therefrom; and
    a fastener positioned within the first slot, wherein the fastener has a second slot formed therein, and the second slot is adapted to engage the edge of the rigid security screen, wherein each of at least two opposing sides of the fastener has a second means for engaging selected from the group consisting of a second plurality of ratchet-shaped recesses formed therein and a second plurality of ratchet-shaped teeth extending therefrom, wherein each of at least two opposing sides of the second slot has a third means for engaging selected from the group consisting of a third plurality of ratchet-shaped recesses formed therein and a third plurality of ratchet-shaped teeth extending therefrom, wherein each of the first means for engaging directly engage at least a portion of a corresponding one of the second means for engaging, and each of the third means for engaging is adapted to engage a portion of the rigid security screen.

* * * * *